May 23, 1939.                    J. H. WILLIAMS                    2,159,193
                                      VISE
                              Filed April 3, 1937
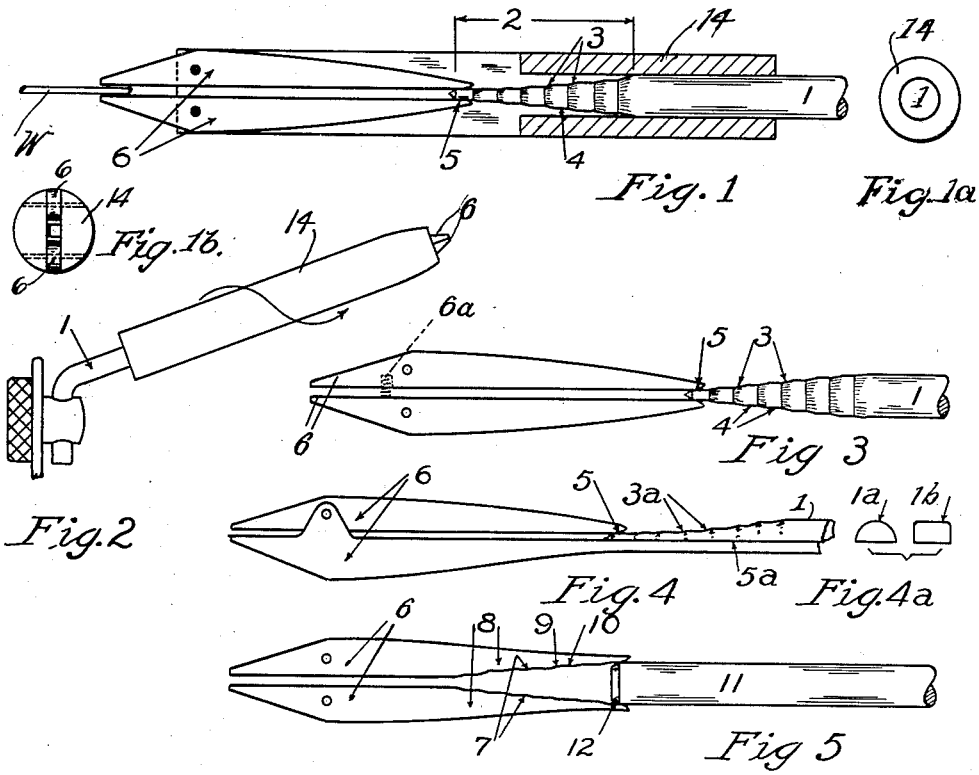
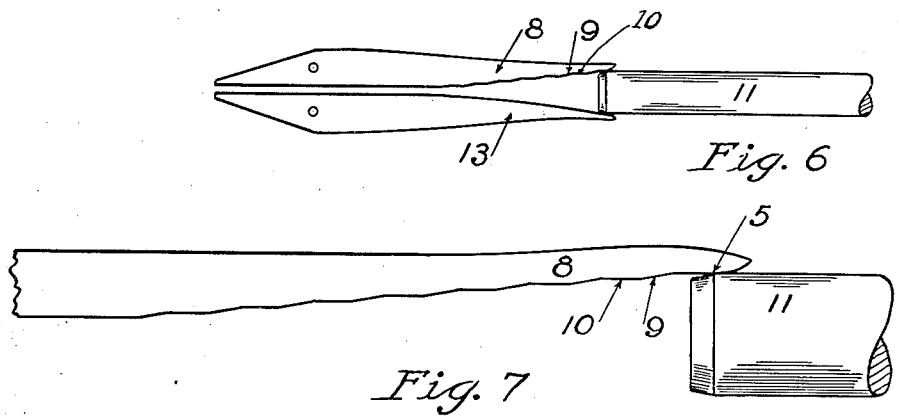
Inventor
JOSEPH H. WILLIAMS
By George B. Willcox
                Attorney Patented May 23, 1939

2,159,193

UNITED STATES PATENT OFFICE 2,159,193

VISE

Joseph H. Williams, Saginaw, Mich.

Application April 3, 1937, Serial No. 134,766

1 Claim. (Cl. 81—4)

This invention relates to improvements in vise-like clamping devices wherein pivoted clamping jaws are operated to grip a work piece by means of a longitudinally slidable rod having wedging engagement against the rearward portions of the jaw members. Such tools are commonly used for holding small articles in convenient position for working on them. Among the uses of devices of this character are, grasping and holding fish hooks while "dressing" them in the making of flies, holding articles of jewelry while polishing or finishing, such as ring and pin settings, also for engraving work, for holding dental inlays, parts of bridge work or similar pieces.

Among the objects of my invention are the provision of a tool of such character, having quick and easy adjustment of its jaws to enable it to grasp an object of given thickness, or objects of various thicknesses, with only a predetermined intensity of pressure so as to not squeeze them unduly. Such adjustments and graduated clamping effects are attained by giving one of the tool members a simple endwise sliding movement until it halts in one of its stepped adjustments, as distinguished from the screw adjustments and plain wedge adjustments heretofore commonly used in earlier clamping devices.

Screw adjusters for the clamping jaws failed to produce the results required of a device of this kind as speedily, nor could they be operated with as little danger of marring the work pieces, as is done with my improved mechanism.

A further object is to provide a simple, positive and reliable mechanism whereby the tool, while clamping an object in the manner above indicated, can be rotated about its longitudinal axis as on a swivel so as to bring any part of the work into any convenient position for the user's purpose, and hold it in that position with a firm but not harmful grip.

My invention comprises the elements, combinations, structural features and arrangements of parts which will be exemplified in the structure herein described, and the scope of the application of which will be set forth in the claim. In the accompanying drawing, in which are illustrated several of the various possible embodiments of the invention, Fig. 1 is a longitudinal sectional view showing the apparatus in a preferred form, and Fig. 1a is an end view, and Fig. 1b is a view of the left-hand end shown in Fig. 1.

Fig. 2 is a side view of the device mounted on a universal joint.

Fig. 3 is a side view of the jaws and their adjusting member only, in a modified form, the housing member being omitted.

Fig. 4 is a similar side view showing another modified form.

Fig. 4a is a detail showing two alternative cross-sectional shapes of push rods or adjusting members that may be used in the device of Fig. 4.

Fig. 5 is a side view of a further modified arrangement of the jaws and adjusting member.

Fig. 6 is a further modified form of the parts shown in Fig. 5.

Fig. 7 is a fragmentary view, on an enlarged scale, showing the rearward portion of a single jaw in its relation to a push rod.

Similar characters of reference indicate corresponding parts throughout the several views of the drawing.

Referring now to Figs. 1 and 2, numeral 1 indicates a rod-like member, shown here as circular in cross section. A portion of the rod, preferably of about the length indicated by the arrows at 2, is tapered and shaped to inclined or wedge-like faces 3; it also has intermediate faces 4 which are non-inclined, that is, they are parallel with the longitudinal axis of the rod, or substantially so. The faces 3, 4 are arranged stepwise, and are progressively enlarged as shown. In the form illustrated in Figs. 1 and 3 the stepped faces 3 are circular in cross-sectional shape. In Fig. 4a, at 1a, they are shown semi-circular, as on a half-round rod, and at 1b they are flat, as on a rectangular rod.

In the forms shown in Figs. 1, 3, 4 and 4a the stepped portion of the rod is received between appropriately shaped ends 5 of rearward extensions on jaws 6. It constitutes the jaw-actuating element. If the rod 1 is moved lengthwise toward the left, Figs. 1 and 3, it closes the jaws with a series of successive step-by-step progressive clamping movements. These clamping movements are caused by the respective inclined faces 3. Between such movements are dwell periods, produced by the engagement of the parts 5 of jaws 6 upon the non-tapered faces 4.

A spring 6a, Fig. 3, is preferably provided between the jaws, tending normally to separate them.

As is shown in the figures just referred to, each inclined face 3 causes the jaws to close a certain amount and then the corresponding non-inclined face 4 holds them in that position, yet permitting the jaws, and any work piece which is held by them, to be rotated freely with respect to the rod 1, in the manner indicated by the curved arrow, Fig. 2. Such rotation positions the work without affecting the degree of clamping force.

All work pieces that are of equal thickness can be clamped with the same predetermined amount of force if the same face 4 is pushed into engagement with the jaw parts 5 each time a fresh piece is inserted. This feature of my device is of advantage in many kinds of work where excessive pressure on the work must be avoided, as in jewelry finishing or like work where a large number of pieces of equal size are to be operated on in rapid succession.

In Fig. 4 is illustrated a modified structure embodying my invention, wherein the rod 1 has one straight non-tapered face 5a and a face 3a opposite thereto which is stepped as explained for Figs. 1 and 3. The flat face 5a serves as a guide for the slidable rod 1 and the stepped face 3a actuates the jaw member 5.

In the modified structure, Fig. 5, the inner faces 7 of both rearward members 8 of jaws 6 are formed with successive inclined parts 9 and non-inclined faces 10 for stepwise clamping and holding movements of the jaws with respect to the rod, and for free rotation of the jaws relatively to the rod. In this example, Fig. 5, the rod 11 itself is not stepped, but has a blunt end 12 which is received between the jaw members 8.

It is to be noted that in both this and the previously described embodiments of my invention, the rod and jaw members present mutually co-acting faces. Certain of these faces, as 3, Fig. 1, or 9, Fig. 5, are inclined, and in stepwise relation to each other. The other mutually co-acting faces, as 4, Fig. 1, or 10, Fig. 5, are substantially flat or noninclined, and are adapted to keep the jaws in clamping position although permitting them to be rotated relatively to the rod, for positioning the work in the manner already described.

In the further modified form shown in Fig. 6, rod 11 with a blunt end 12 is used, as in Fig. 5, but only one of the rearwardly extending jaw members, 8, has the alternating inclined and flat areas 9, 10. The other jaw member 13 has a smooth inner face and of course no step-by-step action is produced by it. This modification, Fig. 6, is intended to point out the fact that structural variations of the device may be employed without departing from my invention as claimed.

When the device is used to hold a work piece, say, a fish hook that is to be dressed with feather tips and wound with thread, the piece W is placed between the jaws 6, and the end of rod 1 is pushed in between the rearward ends 5 until the jaws commence to seize the work. Where a gentle seizure is wanted the rod 1 is pushed in only one step further. For still firmer gripping it is pushed in one or more additional steps.

Slight springing of the rearward arms of the jaw 6, or yield permitted by the pivotal mountings of the jaws in the housing member 14, or both such occurrences, provide a degree of resilience sufficient for effectively gripping the work piece.

The housing 14, which may be bifurcated tubular sleeve as shown in Figs. 1 and 2, and the jaws 6 can then be rotated as a unit on the rod 1 without changing the amount of clamping force, so the work piece may be readily turned to any desired rotated or angular position. When rod 1 is mounted in a suitable swiveled bearing, such as shown in Fig. 2, it can be moved through any angular position. Thus by rotating parts 14 and 1 the operator can quickly locate the piece W in any position desired, the clamping force remaining unchanged. In some kinds of work on a plurality of pieces each piece in succession should be held with a predetermined and equal amount of grip. That is accomplished by merely locating the jaw ends 5 always on the same step 4 of rod 1. The non-stepped parts 4 prevent the jaws from slipping so as to become loose while in use, and therein my device differs from earlier implements in which long uniformly tapered or wedge-shaped adjusting rods were used that tended to slip in use.

In the embodiment of Figs. 4 and 4a the graduated wedge and step arrangement for clamping is present, but the feature of relative rotation of the jaws 6 and the rod 1 is not employed. This form is convenient in some classes of work where axial rotation of the work piece is not required.

Having thus described my invention, what I claim and desire to secure by Letters Patent is:

In a vise having a tubular sleeve with a bifurcated end portion, opposed jaw members pivotally connected, a longitudinally movable jaw-actuating element operatively received between rearward portions of said jaw members, said jaw-actuating element and the rearward portion of at least one of the jaw members engaged thereby presenting mutually coacting faces, certain of said faces being arranged stepwise relatively to each other and inclined; others of said faces intermediate said stepwise faces being non-inclined, said tubular sleeve being freely rotatable relatively to said jaw-actuating element and having its tubular portion arranged to receive said element in alinement with said rearward portions of the jaw members, and having its bifurcated portion arranged to prevent rotation of the jaws relatively to the sleeve.

JOSEPH H. WILLIAMS.